Sept. 4, 1956 W. W. HERRICK 2,761,414
SCALE DRUM CHART
Filed May 23, 1952 2 Sheets-Sheet 1
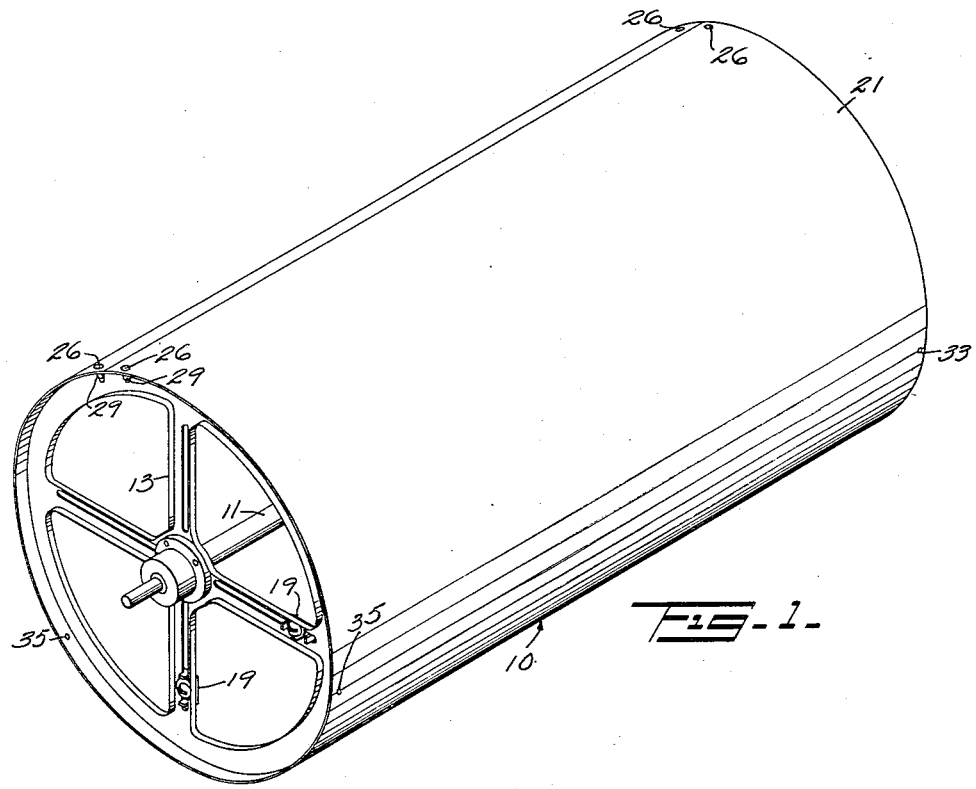
Fig-1-
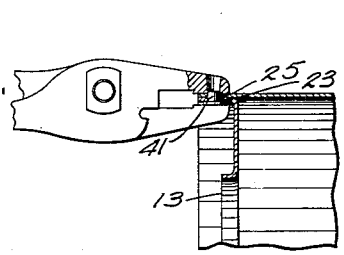
Fig-4-
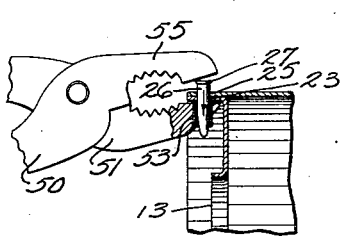
Fig-5-
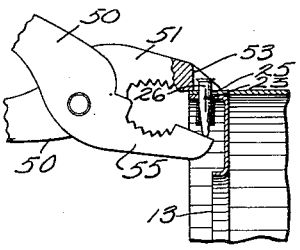
Fig-6-
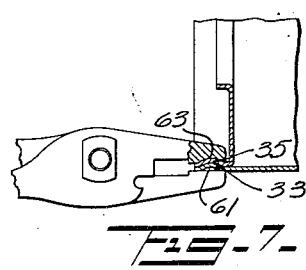
Fig-7-
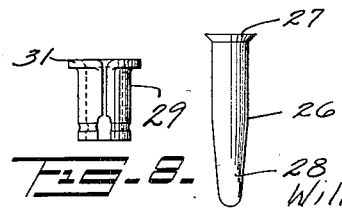
Fig-8-
Fig-9-
INVENTOR
William Wilson Herrick
BY
Edwin H. Over
ATTORNEY Sept. 4, 1956 W. W. HERRICK 2,761,414
SCALE DRUM CHART
Filed May 23, 1952 2 Sheets-Sheet 2
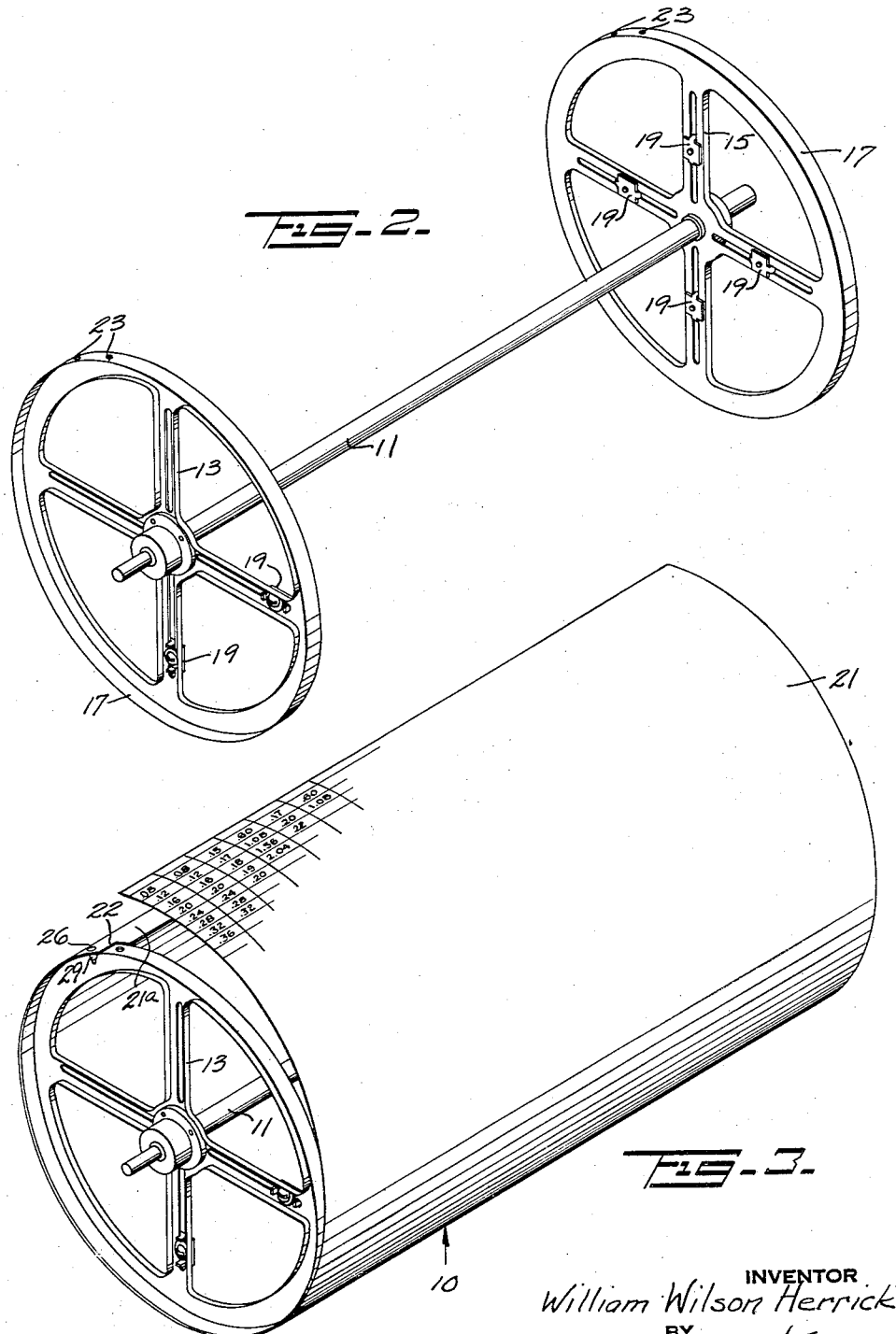
INVENTOR
William Wilson Herrick
BY
ATTORNEY United States Patent Office 2,761,414
Patented Sept. 4, 1956

2,761,414

SCALE DRUM CHART

William Wilson Herrick, Stamford, Conn., assignor to Pitney-Bowes, Inc., Stamford, Conn., a corporation of Delaware Application May 23, 1952, Serial No. 289,535

1 Claim. (Cl. 116—129)

This invention relates to measuring devices equipped with drum-type registering mechanism, and especially to weighing devices or scales having a chart-bearing drum wherein the data of the chart, although fairly permanent, requires changing at one time or another, and to the steps and means for bringing about such change.

The invention is illustrated in connection with parcel post scales having a balanced drum which carries on its surface a chart for indicating postal charges in various zones opposite the weight of the package to be mailed. Inasmuch as the indicia is fairly permanent it is extremely desirable to have the chart constructed of lithographed sheet metal or the like so that the indicia will remain clear and legible for long periods of use. From time to time, however, changes in postal regulations require corresponding changes in the chart indicia, and replacement of the drums of all the scales in use has been the only practice heretofore considered in meeting this exigency.

It has been found, however, that where large numbers of such scales are in use, all of which must be changed at about the same time, the handling, packing and storing of drums in the quantities needed has offered serious problems.

An object of the present invention, therefore, is to provide a method and means for completing extensive drum chart changes without handling and storing quantities of drums at the manufacturing and service points. This object is attained according to the present invention by devising a means and method for readily changing the charts themselves in the field, whereby the charts alone may be stored and shipped flat, and may be formed and made a part of the drum when needed.

Since the registering drums of scales and similar devices are normally provided with balancing means, and are balanced with extreme accuracy before being put to use, it is another object of the present invention to provide for effecting chart replacement on registering drums in such fashion that the change, even though capable of being readily effected, will not seriously effect the balance of the drum, and will remain well within the corrective range of the balancing devices normally provided.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings, wherein:

Fig. 1 is a perspective view of a registering drum showing the same assembled with the chart-bearing member secured in place.

Fig. 2 is a perspective of the drum core with the chart-bearing member removed.

Fig. 3 is a view similar to Fig. 1, but illustrating the chart-bearing member in the process of application to the drum core.

Fig. 4 is a fragmentary section illustrating the piercing step in the attachment of a new chart.

Fig. 5 is a fragmentary section illustrating the fastener placing step in the attachment of a new chart and the tool used for the purpose.

Fig. 6 is a fragmentary section illustrating the fastener removing step in the removal of an old chart and the use of the tool of Fig. 5 in this connection.

Fig. 7 is a fragmentary section illustrating the crimping step in the attachment of a new chart.

Figs. 8 and 9 are side elevations of the parts of a separable and reusable fastener employed in carrying out the invention, as shown in Figs. 5 and 6, but drawn to a larger scale, Fig. 8 being the female part, and Fig. 9 being the male part.

Referring to the drawings the present invention is concerned with a registering drum 10 as shown in Figs. 1 and 3 which may be the drum of a parcel post scale, for example. As will be understood, the drum 10 bears chart indicia and is moved opposite an index by a weighing mechanism, so that when it comes to rest the weight and corresponding postal charges in various zones are indicated. The drum includes a shaft 11 to which are secured the spaced end members or spiders 13 and 15. Each of the spiders 13 and 15 is formed of light weight sheet metal and is provided with an axially extending flange 17. Radially adjustable weights 19 are provided at appropriate locations on the end members 13 and 15 for bringing the drum into exact balance prior to its use in the scale or other measuring device of which it is a part.

As seen in Fig. 2, the end members 13 and 15 are arranged on the shaft 11 with their flanges 17 extending outwardly in opposite directions, to form a mounting means or core for the chart-bearing element of the drum. Wrapped around this core is a sheath 21 of light gauge sheet metal which completes the drum and provides a surface upon which the chart indicia may be formed. For most purposes it is preferable to have the chart indicia of relatively permanent character formed, for example, by lithographing the surface of the sheath 21 whereby the indicia will remain clear and readable for a long period of time.

Drums of the character shown and thus far described are of more or less permanent character and, although light in weight, are intended to be sturdy and provide service of indefinitely long duration. From time to time, however, the circumstances require that the chart indicia on the drum be changed. For example, in the case of a parcel post scale, when the rates are changed by law the substitution of a new chart for the old one becomes necessary to maintain the usefulness of the scale for its intended purpose.

Heretofore it has been proposed to remove the drum, including at least the end members 13 and 15 and the sheath 21, and to replace the same with a substitute drum completely assembled and shipped from the point of manufacture. However, when such a change must be carried out on a large number of instruments at about the same time, the handling, packing, and storage of the drum offers severe problems which this invention is designed to overcome.

In accordance with the present invention the sheaths or chart-bearing members 21 can be manufactured and shipped in flat, stacked condition so as to occupy a minimum of space, both at the manufacturing and servicing points, and can be assembled on the end members 13 and 15 by a serviceman in the field in an extremely simple and effective fashion with results equivalent to those which could be achieved by replacing the drum 10 as a whole. In drums as now constructed and which have charts to be replaced by the method of this invention it will be found that the sheath 21 is held to the flanges 17 by rivets or similar permanent-type fastening means (not shown) located adjacent the edges of the sheath and in close proximity to the joint line where the ends of the sheath meet. These rivets are placed at the factory and are not intended to be removed. To remove the old sheath, therefore, it is necessary to remove these rivets which may be done, for example, by drilling out the heart and crushing the rivet to make it small enough to be readily withdrawn. The old sheath 21 is then free and can be removed from the drum and discarded.

The process of applying a new sheath 21 is illustrated particularly in Figs. 3, 4, 5 and 7. First one end of the sheath is laid along the drum with its margin in contact with the flanges 17 of the end members 13 and 15. A suitable punch or piercing member 40 is used, and its male punch member 41 is arranged to fit and pass through the rivet openings 23 in the flanges 17. An opening 25 is then punched in the sheath in line with the rivet opening 23 as shown in Fig. 4. Through these openengs 23, 25 is passed the male element or pin 26 of a releasable and reusable fastening means. The pin is preferably formed with a head 27 and a tapering nose 28. The female element 29 of the fastening means is in the form of a split friction sleeve having a flange 31 and is passed over the tapered end 28 of the male member 26, flange end first. The fastener 26, 29 is then tightened by means of a suitable tool 50, shown in Fig. 5, which takes the form of a pair of pliers, one jaw 51 of which has an end opening recess 53 of a size to receive the barrel portion of the split sleeve 29. The inner face of the recessed jaw 51 therefore abuts the flange 31 of the split sleeve 29 while the face of the other jaw 55 is made to rest against the head 27 of the male member 26, as seen in Fig. 5. By forcing the jaws together, the head 27 of the male member and the flange 31 of the split sleeve are caused to clamp the flange 17 and the edge of the sheath 21 tightly between them. The placement of another fastener 26, 29 adjacent the other side of the sheath is then effected by repeating the foregoing steps. When the placing of these two fasteners 26, 29 has been completed at each side of the first end of the sheath 21, the sheath is wrapped tightly around the mounting means 11, 13, 15 in contact with the flanges 17, as shown in Fig. 3, until the other end of the sheath 21 also approaches contact with the flanges 17. When the second end of the sheath is in place against the flanges 17, it is secured in the same manner as the first end, by following the piercing and fastener placing steps illustrated in Figs. 4 and 5 to complete the assembly of the chart-bearing sheath 21, on the mounting means.

In order to anchor the sheath firmly and prevent any possibility of shifting, the sheath may be very simply and readily interconnected with the flanges at the other points by means of an embossing or crimping tool 60 such as that illustrated in Fig. 7. One jaw of this tool carries a male die member 61 which cooperates with a complementary female die member 63 on the other jaw. When the jaws are brought together with portions of the sheath 21 and flange 17 between them, interlocking embossments 33 and 35 respectively are formed in the corresponding parts which will thereby be firmly retained against any axial or peripheral shifting relative to each other. Such embossments are preferably arranged evenly about the drum periphery, two embossments each spaced about 120° from the fasteners 26, 29 having proved satisfactory at each end of the drum. These embossments also aid in holding the end members 13 and 15 in proper alignment perpendicular to shaft 11, thus counteracting any pull which might be exerted by the end edges of the sheath 21, and also, through the intermediary of said end members 13 and 15, help to hold said end edges of sheath 21 taut to form a smoothly closed joint.

When the assembly of the drum has been completed as described above, the weights 19 can be moved slightly, as necessary, to bring the drum back into exact balance since no substantial structural changes or weight distribution has been required to replace the chart-bearing sheath 21. Thus the range of balance adjustment of the weights 19 as originally designed will be sufficient to accommodate any adjustment required for the reassembled drum.

After the chart 21 has been once changed in the foregoing fashion, subsequent changes can be readily made without the necessity for removing permanent fastenings such as rivets, the fasteners 26, 29 being readily removable and replaceable for use with the new sheath when in place. Fig. 6 illustrates how the tool 50, used for placing the fasteners 26, 29, may also be employed to good advantage for removing the same. As seen in Fig. 6, the tool 50 is merely reversed so that the recess 53 of the jaw 51 embraces the head 27 of the pin 26 and the jaw 55 is in contact with the nose 28 of the pin. When the jaws are brought towards each other, the pin 26 is forced upwardly in Fig. 6 to a position such that its head is well exposed and readily graspable for withdrawing the pin from the split sleeve 29. When the fasteners 26, 29 have all been removed and the old sheath 21 discarded, the new sheath will be placed in accordance with the steps heretofore described.

As seen in Fig. 3, it is often desirable to provide sheath members 21 which are slightly longer than the periphery of the flanges 17 in order that there may be a slight overlap of the ends of the sheath giving a smoothly finished appearance. In this case each corner of the end of the sheath first attached is notched as indicated by reference character 22 in Fig. 3. The notches are wide enough to accommodate the flange 17 and long enough to clear the other end of the sheath 21 when it is wrapped completely around the end members and fastened in place. Thus the corners of the sheath where the fastenings 26, 29 are placed will form a butt joint backed up by the flanges 17, while a portion 21a of the sheath lying between the notches 22 will be slightly depressed and will underlie the opposite end of the sheath between the end members 13 and 15 to form a smooth lap joint therewith.

From the foregoing description it can be seen that this invention provides a novel structure and method relating to the replacement of a chart-bearing drum on measuring devices such as scales, and providing for the convenient and rapid replacement of one chart by another without impairing the ability of the drum to be balanced by the conventional means provided for that purpose, even though the chart members are of a relatively permanent nature forming a substantial structural portion of the drum itself. Having described the invention, what is claimed is:

An indicator drum comprising a pair of spaced circular end members coaxially arranged, said end members having axially extending flanges; a replaceable chart-bearing sheath wrapped around and supported by said flanges and forming the surface of the drum; said flanges having openings therethrough and said sheath having openings in alignment with said flange openings; and readily removable and reusable fasteners comprising headed pins passing through said aligned openings for securing said sheath to said flanges, and split friction sleeves each so engaging its pin as to clamp the sheath and the respective flange between itself and the head of said pin.

References Cited in the file of this patent

UNITED STATES PATENTS

| Number | Name | Date |
|---|---|---|
| 653,610 | Bernardin | July 10, 1900 |
| 911,162 | Rockwood | Feb. 2, 1909 |
| 1,157,226 | Kenny | Oct. 19, 1915 |
| 1,458,477 | Gamble et al. | June 12, 1923 |
| 2,295,685 | Place | Sept. 15, 1942 |
| 2,315,710 | King | Apr. 6, 1943 |
| 2,344,423 | Simmons | Mar. 14, 1944 |
| 2,393,030 | Eggert | Jan. 15, 1946 |
| 2,476,046 | Karp | July 12, 1949 |